Patented Dec. 12, 1944

2,365,125

UNITED STATES PATENT OFFICE 2,365,125

NICKEL CATALYST

Hans W. Vahlteich, Edgewater, and Ralph H. Neal, Jersey City, N. J., assignors, by mesne assignments, to The Best Foods, Inc., New York, N. Y., a corporation of New Jersey No Drawing. Application February 28, 1942, Serial No. 432,828

7 Claims. (Cl. 252—224)

This invention is concerned with the production of nickel catalysts and more particularly with the control of the particle size and other characteristics of the nickel catalyst to provide an improved product for use in the hydrogenation of vegetable oils. It is especially concerned with the production of an improved nickel catalyst, the use of which results in a substantial saving in the amount of nickel required to satisfactorily hydrogenate vegetable oils under commercial conditions.

It has previously been known to produce nickel catalysts by decomposing nickel formate or other nickel salts of organic acids in an inert atmosphere to produce active nickel catalysts. Such procedures are described, for example, in the copending applications of Borkowski and Schille, Serial No. 342,446, filed June 26, 1940, and Serial No. 394,094, filed May 19, 1941.

In the use of such procedures, in which the decomposition or reduction takes place at atmospheric or higher pressures, the product is in the form of very finely divided, amorphous particles so small as to approach submicroscopic particles and having an estimated diameter of about ½ micron and it was considered that the smaller the particle size the more active the catalyst would be, since it would present more external surface. Such catalyst may be used to advantage with a sorbent material, as described in the above mentioned applications, but where it is necessary to produce practically saturated oils, such, for example, as in the production of hard butter type oils having an iodin number of less than one or in the production of saturated peanut oils having an iodin number of 2 or less, it is necessary to add new catalysts frequently and the catalysts recovered cannot be re-used as much as is desired. Also, the hydrogenated oil will retain some of the finely divided catalyst which causes the oil to deteriorate more rapidly on standing.

It is an object of the present invention to provide an improved procedure for producing active nickel catalysts whereby particles of larger and controlled size may be formed. A further object is to provide a procedure by which such larger sized particles are more active or more effective in the hydrogenation of vegetable oils. Another object is to provide an improved active nickel catalyst. Other objects will become apparent.

We have found that a very important improvement results from carrying out the decomposition or reduction of the nickel salt of an organic acid under a partial vacuum and preferably in an inert atmosphere. While some improvement has been noted with vacuums as low as 5 inches of mercury, it is preferred to operate at vacuums of 10 to 25 inches of mercury and preferably about 20 inches. The maximum vacuum usable in the process depends upon the equipment used. Quicker results may be obtained with higher vacuums if mechanical difficulties can be avoided in the equipment used. The invention may also be used to a lesser degree at lower vacuums.

By following such a procedure a very active nickel catalyst predominantly of particle sizes of about 2 to 10 microns, preferably 3 to 6 microns, and with numerous particles up to 20 or 25 microns, can be prepared. The reduction under vacuum should be controlled and limited so as to avoid reducing the particles to smaller sizes, since such further reduction will cause them to lose their increased activity.

The decomposition or reduction of the catalyst may be better controlled by heating in a mixture of white mineral oil and vegetable oil. The use of white mineral oil alone results in a less active catalyst; with vegetable oil alone the reduction is too vigorous and also difficult to control. We have found that the use of U. S. P. neutral white mineral oil (for example, one having a viscosity of 335 to 345° Saybolt at 100° F., a specific gravity of .885 to .895 at 60° F. and a boiling point range of 560 to 790° F.) in the amounts of about 4 to 14 times the weight of nickel present in the nickel salt, and preferably about 10 times the weight of nickel present, is satisfactory, although smaller or larger amounts may be used under certain circumstances. Also, other neutral white mineral oils may be used, preferably the higher boiling point ones, for example, within the boiling point range of 615 to 890° F. The vegetable oil may be about ¼ to 1 part by weight per 1 part of nickel in the nickel salt and is preferably about ½ part of vegetable oil to 1 part of nickel. A suitable mixture is one such as to give 10% nickel (calculated as metallic nickel), 5% vegetable oil and 85% mineral oil. The vegetable oil used in admixture with the mineral oil vehicle is preferably the same as or at least compatible with the oil to be hydrogenated with the catalyst. For example, a portion of the hydrogenated oil from a previous hydrogenation may be used for this purpose. However, the amount used is so small in comparison with the amount of oil to be treated with the catalyst that the selection of a suitable vegetable oil is not difficult.

The reduced nickel may be metallic nickel or some nickel compound such as a nickel hydride, and the term "active nickel" as used herein is intended to include metallic nickel and/or other forms of nickel capable of catalyzing the hydrogenation of vegetable oils.

As a specific example of our improved process, about 300 grams of powdered commercial nickel formate was mixed with about 720 grams of white mineral oil and about 42 grams of refined cottonseed oil. The mixture was then agitated and heated to about 450° F. in a nitrogen atmosphere, and at about atmospheric pressure, in order to drive off the water of crystallization of the nickel formate. With the particular apparatus used, this required about one hour.

The vacuum was then applied and the flow of nitrogen gas continued, but was decreased to give a vacuum of about 15 to 20 inches of mercury. The temperature was raised to about 475° F. and the material was held at that temperature for about 10 to 15 minutes, or until substantially all the gaseous products of decomposition had been released, and was then raised to about 520° F. and held at that temperature for about 10 to 15 minutes. The temperature was then reduced quickly to below about 475° F., below which it could be further cooled without particular care.

The resultant product was cooled to about 200° F. and mixed with an activated carbon sorbent in the proportions of about 15 times the amount of active nickel present. The mixture was then added to the oil to be hydrogenated and the hydrogenation carried out in the usual manner. For example, for the hydrogenation of peanut oil substantially to saturation, that is, to a melting point of approximately 140 to 145° F. and an iodin number of 1 to 5, or for the hydrogenation of "hard butter" type oils (such as palm kernel oil, coconut oil, babassu oil or similar oils suitable for use in preparing "hard butters") to an iodin number of less than 2, the catalyst may be used in the proportions of about .05 to .08% of metallic nickel based upon the amount of oil to be hydrogenated. The hydrogenation may be carried out at a temperature of about 350 to 380° F. with rapid agitation. After the hydrogenation is completed, the catalyst and activated carbon may be readily filtered out and may be re-used in a subsequent operation, sufficient fresh catalyst being added to make up for any loss. Of course, when the hydrogenation of the oil is less drastic (to a higher iodin number), smaller quantities of the catalyst will be required. For instance, in hydrogenating cottonseed oil to an iodin number of 60 to 70, only about one-tenth of this amount of catalyst would be required.

The relatively small amount of mineral oil associated with the active catalyst to be added to the oil to be hydrogenated may be removed, if desired, by filtration to separate the main portion of the liquid from the catalyst or it may be separated by gravity settling followed by drawing off the clear oil fraction composed principally of mineral oil with a small amount of vegetable oil in it. Such procedures to separate the mineral oil may be unnecessary, however, since, in any event, it is normally substantially, if not completely, removed during the subsequent deodorizing of the hydrogenated vegetable oil.

The activated carbon itself serves as a sorbent and filter aid but if used alone it may compact too much in the filtering operation. It is preferred, therefore, to also use a filter aid, such as diatomaceous earth (filter cel) or fuller's earth, to give the desired porosity to the filter cake. The filter aid may be added before the reduction of the catalyst, but this is not necessary and, in fact, it is preferred to add it after the reduction to active nickel, since if present during the reduction it interferes with microscopically determining the sizes of the nickel particles, which determination serves as an important indication in the control of the reduction of the catalyst.

The above example is given as illustrative and may be altered to meet varying conditions and requirements. For example, the nickel formate may be heated at temperatures of 400 to 450° F. in driving off the water of crystallization. Also, if desired, vacuum may be applied in this step, due care being taken in the choice of equipment, etc. to avoid excessive frothing. The heating to decompose and drive off gases of decomposition may be carried out at temperatures of 470 to 480° F. for 10 to 45 minutes, depending upon the time required to remove the gaseous products of decomposition. The heating thereafter is preferably at temperatures of 500 to 525° F. for 5 to 25 minutes. Higher temperatures, for example up to 550° F., have been used for a shorter time, but the results were not as satisfactory as with the preferred temperatures.

Also, the active nickel may be cooled to 200 to 250° F. before mixing with activated carbon and the amount of activated carbon may be varied, for example, from 5 to 20 times the amount of active nickel present, but is preferably 7½ to 10 times that amount.

Although it is not intended to limit the invention to any particular theory of operation, it is believed that the application of vacuum during the decomposition of the nickel organic salt causes the gases within the particles, which are mechanically held therein and those formed during the reaction, to be drawn out of the particles before the internal pressure becomes such as to cause the particles to explode violently and disintegrate into small particles. There is a critical temperature at which the organic salt decomposes and the vacuum appears to increase the temperature range over which the decomposition takes place and also somewhat lowers the temperature of the decomposition. The drawing out of the gases apparently increases the available active surface area of the catalyst. It also appears to retard or control the deformation of the particles and permits them to form particles with enlarged surfaces, much like in the popping of pop-corn, but without such deterioration as would result in bursting the particles into small bits; thus leaving active catalyst particles of greatly increased surface area and of sufficient ruggedness to stand up and maintain their particle sizes for a longer period. The characteristic form of the product is readily observed under a high powered microscope by first diluting the sample of reduced catalyst with a suitable oil solvent such as carbon tetrachloride; the active nickel particles appear as distinct, sharp cornered and apparently cubical structures, resembling in form sodium chloride crystals.

The form of the catalyst is important particularly for use in severe hydrogenations, for example, in hydrogenations to a very low iodin number or where the removal of the last portion of the unsaturation is important, since the difficulties in hydrogenation increase as the iodin number is lowered for a particular oil toward complete saturation.

By using a catalyst prepared as described, a given weight of the active catalyst will successfully hydrogenate a greater weight of vegetable or other fatty oil than with catalysts prepared by prior practices. Because of the larger particle size and increased activity, the hydrogenation to the desired degree may be accomplished with less loss of catalyst. Also, the oil hydrogenated to the desired physical characteristics will keep for a longer time because of the more complete removal of the nickel catalyst from the oil during the filtering operation. The ruggedness of the particles will permit the repeated reuse of the catalyst in severe hydrogenations, such as the hydrogenation of peanut oil having an iodin number of 90 to 95 down to an iodin number of about 5 or less, or as in the preparation of "hard butter" type oils. The catalyst may also be used to advantage in less severe hydrogenations, such as the hydrogenation of cottonseed oil having an iodin number of about 105 to 110 down to an iodin number of about 70, as required in the preparation of margarine oil or in the preparation of oils for other uses.

The vacuum applied during the decomposition of the nickel organic salt may be controlled by varying the input of nitrogen or other inert or non-reducing gas into the vessel in which the catalyst is being decomposed or reduced. For example, if the apparatus used is such that a higher vacuum is obtained, this may be reduced by introducing nitrogen or other inert gas, for example, as argon and helium, etc. into the apparatus. The flow of nitrogen or other inert or non-reducing gas through the apparatus also helps to scrub out the gaseous products of reduction. The nitrogen or other inert or non-reducing gas is used, instead of a reducing gas, to decrease the vacuum and to scrub out the gaseous products of the reduction, in order to better control the extent of the decomposition and resultant breakdown of the particles. The use of a reducing gas for this purpose causes the reaction to go too far with a resultant breaking down of the particles into smaller and less active particles.

It is obvious that many other variations may be made in utilizing our improved procedure and such variations may require changes in the details of operation described in the illustrative examples. For example, the invention may be utilized in the preparation of active nickel catalysts from other nickel salts of organic acids that decompose with the formation of hydrogen. For instance, nickel acetate, nickel oxalate, nickel benzoate, etc. may be used for this purpose. Such decomposition of the organic salt with formation of hydrogen provides sufficient hydrogen to maintain the desired reducing atmosphere so no hydrogen, as such, need be added.

The temperatures and times of the decomposition or reduction of the nickel organic salt may be varied, depending upon the particular salt used and upon the equipment and details of the procedure employed. The conditions of decomposition of the nickel organic salt, and particularly the temperature, time and per cent. of vegetable oil in the mineral oil vehicle, should be selected so as to quickly decompose or reduce the organic salt, but should be such as to sufficiently retard the reaction to permit control and avoid excessive subdivision of the particles. The speed of the reaction may be cut down, if desired, by using a higher percentage of mineral oil in the oil vehicle. In commercial operations it is usually preferred to operate at as low a temperature and vacuum, and as high a percentage of vegetable oil, as is practicable. The preferred maximum temperatures in this process are 10 to 30° F. lower, or the times are 15 to 20 minutes shorter, than in prior practices in the reduction of nickel organic salts without the use of a vacuum as described herein.

Although it is preferred to use a mixture of vegetable and mineral oil as described above for the liquid vehicle in which to decompose the nickel salt, the invention may also be used in the decomposition of nickel salts in other heat transferring liquids, such, for example, as in a mixture of mineral oil and animal fats or other glyceridic fats and oils or a mixture of mineral oil and fatty acids. It may also be used to some advantage with decompositions in mineral oils alone or vegetable or animal, etc. oils or fats or fatty acids alone or in other liquids that are not deleterious to the nickel catalyst and that are not excessively volatile under the conditions of operation. Such a vehicle will be referred to in the claims as a non-aqueous, non-volatile liquid vehicle, although it is understood that it may be volatile under other conditions and may be somewhat volatile under the conditions of use, provided that not too much of the vehicle be distilled during the processing described herein. In using the term "oil" in the appended claims, it is intended to include solid oils sometimes referred to as fats, and in using the term "fatty oil" it is intended to include vegetable, animal and fish and other glyceridic oils, as well as fatty acids of such oils.

Other variations in the use of the invention will be obvious to those skilled in the art. The terms used in describing the invention have been used in their descriptive sense and not as terms of limitation and it is intended that all equivalents of the terms used be included within the scope of the appended claims.

We claim:

1. A method for preparing an active nickel catalyst comprising heating a nickel salt of an organic acid in a mixture of white mineral oil and a fatty oil containing about 4 to 14 parts by weight of white mineral oil and about ¼ to 1 part by weight of fatty oil to one part of nickel to decomposition temperatures under a vacuum of about 10 to 25 inches of mercury.

2. A method for preparing an active nickel catalyst comprising heating nickel formate in a mixture of white mineral oil and vegetable oil containing about 7 to 14 parts by weight of mineral oil and about ¼ to 1 part of vegetable oil to 1 part of nickel to temperatures of about 450 to 550° F. in a non-reducing atmosphere and under a vacuum of about 10 to 25 inches of mercury.

3. A method for preparing an active nickel catalyst comprising heating nickel formate in a mixture of white mineral oil and vegetable oil containing about 10 parts by weight of mineral oil and ½ part of vegetable oil to 1 part of nickel to temperatures of about 450 to 520° F. in an inert atmosphere and under a vacuum of about 20 inches of mercury.

4. A method for preparing an active nickel catalyst comprising heating nickel formate in a mixture of white mineral oil and vegetable oil containing about 7 to 14 parts by weight of white mineral oil and about ¼ to 1 part of vegetable oil to one part of nickel to 400 to 450° F. in a nitrogen atmosphere to drive off water of crystallization, thereafter heating it to 470 to 480° F. in a nitrogen atmosphere and under a vacuum of about 10 to 25 inches of mercury to drive off gaseous products of decomposition and thereafter heating it to 500 to 525° F. in a nitrogen atmosphere and under a vacuum of about 10 to 25 inches of mercury.

5. An active nickel catalyst prepared by heating a nickel salt of an organic acid in a mixture of white mineral oil and a fatty oil containing about 4 to 14 parts by weight of white mineral oil and about ¼ to 1 part by weight of fatty oil and one part of nickel to decomposition temperatures under a vacuum of about 10 to 25 inches of mercury.

6. An active nickel catalyst prepared by heating a nickel formate in a mixture of white mineral oil and vegetable oil containing about 7 to 14 parts by weight of mineral oil and about ¼ to 1 part of vegetable oil to 1 part of nickel in an inert atmosphere to decomposition temperatures between 450 to 550° F. under vacuums of about 10 to 25 inches of mercury to provide particles predominantly of about 2 to 10 microns.

7. An active nickel catalyst prepared by heating a nickel formate in a mixture containing about 10 parts by weight of white mineral oil and ½ part of vegetable oil to 1 part of nickel to a temperature between 450 to 550° F. in a non-reducing atmosphere and under a vacuum of about 20 inches of mercury to provide particles predominantly of about 3 to 6 microns.

HANS W. VAHLTEICH.
RALPH H. NEAL.